Dec. 29, 1970            B. REICH            3,551,783
RECTIFIER AND TRANSIENT SUPPRESSOR
Original Filed Feb. 27, 1968
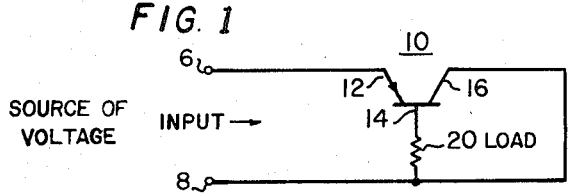
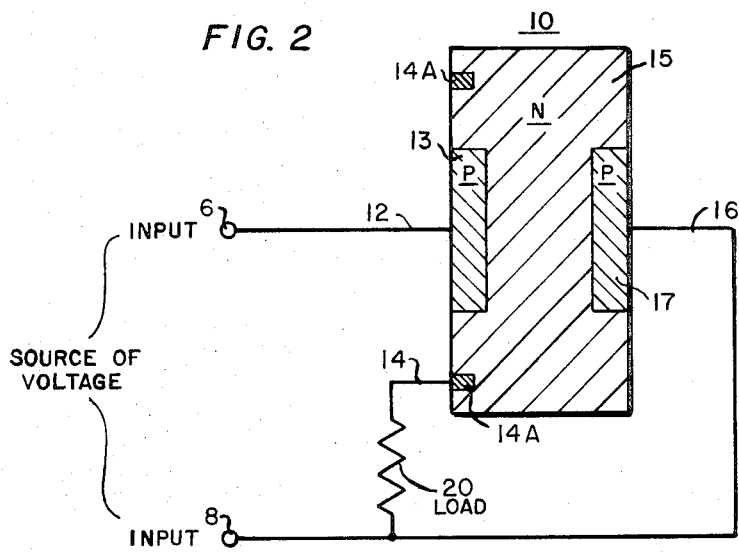
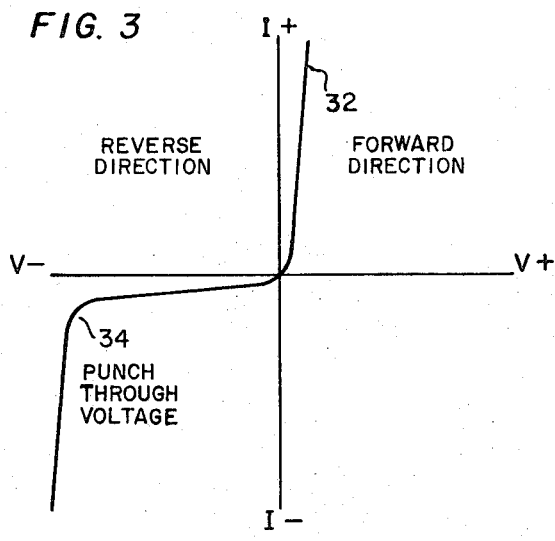
INVENTOR,
BERNARD REICH.
BY Charles F. Gunderson, AGENT.
Harry M. Saragovitz
Edward J. Kelly + Herbert Berl
ATTORNEYS.

United States Patent Office 3,551,783
Patented Dec. 29, 1970

3,551,783
RECTIFIER AND TRANSIENT SUPPRESSOR
Bernard Reich, Wanamassa, N.J., assignor to the United States of America as represented by the Secretary of the Army
Continuation of application Ser. No. 708,626, Feb. 27, 1968. This application Jan. 21, 1970, Ser. No. 4,467
Int. Cl. H02h 7/14; H02m 1/18
U.S. Cl. 321—14                              4 Claims

ABSTRACT OF THE DISCLOSURE

This disclosure relates to transient voltage suppressors and, in particular, to a transient-voltage suppressing device that uses one junction of a multi-junction, solid-state device as a normal diode that is connected to a load in a conventional rectifying or detecting circuit, and another junction of the multi-junction solid-state device as a reverse-connected punch-through diode that is connected across both the normal diode junction and the load to act as a short circuit, for peak, transient voltages, that bypass both the normal diode and the load.

---

The invention described herein may be manufactured, used, and licensed by or for the Government for governmental purposes without the payment to me of any royalty thereon.

This is a continuation of application Ser. No. 708,626, filed Feb. 27, 1968.

BACKGROUND OF THE INVENTION

The functions of rectifiers or detectors, in general, are very well known. These rectifiers or detectors are usually diodes or diode-connected devices used to connect a source of signals or energy to a load.

Devices for the elimination of transient peaks of voltage or current are also known. These include many very complex devices for absorbing or shunting the transient energy as well as simple devices for bypassing the transient energy around a load. Most of these devices can be combined with rectifying or detecting circuits to protect either the load or the rectifier itself from any peaks of transient voltage or current that would be damaging. Transient-suppressing devices may be voltage sensitive or current sensitive as well as polarity sensitive.

However, all such transient-suppressing devices add more elements to the circuit, and, even if they are not relative bulky, they still require wiring for connections into the circuit, whereas the trend today must always be to eliminate all the elements and extra wiring that can possibly be eliminated; to reduce size, weight, and cost of the overall device; and to provide the most efficient, economical, and reliable functioning that is possible.

There is a particular need for protection against sudden surges of transient voltage or current in equipment where the power supply is prone to develop or carry transient voltages, or where the circuit or load is of a type that can be damaged or destroyed by a transient pulse.

There is also a need for polarity sensitive connections to protect certain devices against the accidental reversal of the polarity of the power supply, where the device is of a type that may be damaged or destroyed, almost instantly, by a surge of current from a reversed connection before conventional fuses or circuit breakers can react to the surge.

It is therefore an object of the invention to provide an improved transient suppressor and rectifier that will react instantaneously to all peaks of voltage over a given value, that will protect both the load and the rectifier itself, and that has the transient suppressor as an integral unit with the rectifier and inseparable from the load that is to be protected.

SUMMARY OF THE INVENTION

These and other objects are accomplished by connecting a source of power, that may have transient components, through one of the junctions of a transient, in a forward direction, to a load, and connecting another junction of the same transistor, in a backwards direction, across the source of power.

BRIEF DESCRIPTION OF THE DRAWINGS

FIG. 1 is a circuit diagram of a typical embodiment of this invention.

FIG. 2 is an enlarged, cross section of a typical, solid-state device with two junctions; and FIG. 3 is a characteristic curve of a typical, solid-state junction.

DETAILED DESCRIPTION OF THE DRAWINGS

Referring now more particularly to FIG. 1 a PNP transistor 10 is shown having emitter, base, and collector electrodes 12, 14, and 16 respectively. The emitter-base circuit, between the electrode 12 and 14, is connected in series with a load 20 across input terminals 6 and 8. The emitter-collector circuit, between the electrodes 12 and 16, is connected directly across the input terminals 6 and 8.

In operation, a source of power, or other input that may include transient voltage or current peaks, is applied to the input terminals 6 and 8. The transistor 10 has its emitter-base junction connected in the forward direction to function as a diode or rectifier.

For the purposes of this typical example the input may be D-C or A-C or a combination of the two. The rectifying junction 12–14 supplies current to the load 20 in its forward direction and will cut off the current to the load in its reversed direction for A-C or in the event of reversal of polarity of a D-C input.

The emitter-base junction will function as a rectifier for all normal voltages and the junctions between the emitter and collector electrodes will present a high impedance to normal voltages. However in the event of a transient-voltage that exceeds the punchthrough voltage of the emitter-collector circuit, the emitter-collector circuit presents a low-impedance to the excessive portion of the transient voltage. This acts as a short circuit, directly across the input terminals, to bypass both the load and the emitter-base rectifying junction. This function of the emitter-collector junctions will be better understood by referring to FIGS. 2 and 3.

FIG. 2 shows a very-much-enlarged cross section of a typical, solid-state device to perform this function. The elements similar to those of FIG. 1 are similarly numbered. The transistor 10 has an emitter electrode 12 connected to P-material 13, a base electrode 14 with an electrical contact 14A connected to N-material 15, and a collector electrode 16 connected to P-material 17. Two portions of the electrode 14A are visible because of the cross section.

The other elements of the circuit of FIG. 1 are also shown for convenience. The input is again across the terminal 6 and 8 and the load 20 is connected in series with the emitter-base terminals 12 and 14, of the forward-connected, diode junction, across the input. The emitter-collector terminals 12 and 16 of the reverse-connected, diode junction are connected directly across the input.

This figure illustrates quite clearly the physical relationship of the emitter and collector materials 13 and 17 and the space between them, across which the punch-through affect occurs.

FIG. 3 is a graph of the characteristic curve of a typical junction. This curve shows the relationship of voltage and current across the junction in both the forward and backward directions. It is seen at 32 that very large forward currents will flow with only nominal voltages in the forward direction, but very little current will flow through the junction as the voltage is increased in the backward direction until the point 34 is reached, whereat the punchthrough phenomenon occurs. The emitter-collector circuit is effectively switched at this point to become a very low resistance to currents resulting from the excessive voltage.

In the emitter-collector circuit there are two junctions with opposing directions. One junction is always backward with respect to the input voltage. The backward junction provides a very high impedance across the emitter-collector circuit until the breakdown voltage of the backward junction is reached. The forward junction for the same voltage inherently provides a low impedance.

In this manner all of the energy at voltages in excess of the prescribed amount is short circuited across the emitter-collector junctions to bypass the rectifying emitter-base junction as well as the load.

These emitter-collector characteristics, as well as the emitter base characteristics of a transistor, are well known and need not be discussed in more detail here.

A capacitor, not shown, may be connected across the load 20 to filter out undesirable ripple or other alternating current components that might be expected in the input of almost any power supplied by one of the present day converters. One of the highly-efficient, electrolytic capacitors could be used here, since the rectifying portion of this device will obviously protect the capacitor against damage due to a reversed input polarity, and the transient suppressing portion of this device will protect the capacitor from damage due to excessive voltages. The capacitor will provide a smoother D-C to the load and will also protect the load, to some extent, from sudden variations and surges in the input voltage supply.

It is obvious that the load may be protected, and both junctions of the transistor may also be protected, by other, conventional fuses or circuit breakers. This would be advisable where the excessive voltage may be a prolonged rather than a transient phenomenon. For, while the emitter-collector junction can absorb extremely high currents and power for rather short periods of time, the junction may be severely damaged by a prolonged flow of current and every junction has a limit of current and time, beyond which it will be damaged or destroyed. Such fuses or circuit breakers can be any of the well known types.

The transistor may be chosen to accommodate any desired current through its rectifying junction and the voltage at which the punchthrough phenomenon occurs may be controlled by variation of the size, shape, and spacing of the semiconductor materials, as well as by the choice of semi-conductor material.

In the typical example of a PNP transistor to perform this function, as shown in FIG. 2, the resistivity of the N-material 15 is 50 ohm-cm. A base width of 10 microns gives a punch-through rating of 36 volts between the emitter and collector electrodes. This would be suitable for a working load of 28 volts which would be standard for a typical communication set which would draw a normal load of about 10 amperes.

What is claimed is:

1. A rectifier and transient voltage suppressor comprising a solid-state device having at least two junctions, each of said junctions having one separate terminal and sharing one common terminal; a load; a source of voltage; means for connecting said load in series with the terminals of one of said junctions in a forward direction across said source of voltage; and means for connecting the terminals of the other of said junctions in a backward direction across said source of voltage, the spacing between the terminals of said other of said junctions being in the order of .03 microns per volt of transient voltage suppression across a material of a resistivity of 50 ohm-cm.

2. In a rectifier and transient voltage suppressor as in claim 1, said source of voltage being 28 volts; and the spacing between said terminals of said other of said junctions being 10 microns, to suppress transient voltage peaks above about 36 volts in said source of voltage.

3. A rectifier and transient voltage suppressor comprising a transistor having emitter, collector, and base electrodes; a load connected between said base electrode and said collector electrode; a first input terminal connected to said emitter electrode; and a second input terminal connected to said collector electrode, the distance between said emitter and collector electrodes being in the order of .03 micron per volt for transient voltage suppression, and the transistor material between said emitter and collector electrodes having a resistivity in the order of 50 ohm-cm.

4. A transient voltage suppressor comprising a transistor having a base of N-type material, with a resistivity of 50 ohm-cm. and an emitter and a collector of P-type material opposing each other on either side of said N-type material of said base, the spacing between said emitter and collector of P-type material being in the order of .03 micron per volt of transient voltage suppression; a first input terminal connected to said emitter; a second input terminal connected to said collector; and a load connected between the said base and said collector.

References Cited

UNITED STATES PATENTS

| | | | |
|---|---|---|---|
| 2,655,608 | 10/1953 | Valdes | 317—33X |
| 2,862,171 | 11/1958 | Freeborn | 321—45 |
| 3,092,757 | 6/1963 | Rosenfeld et al. | 317—33X |
| 3,339,080 | 8/1967 | Howald | 321—45X |
| 3,402,325 | 9/1968 | Minks | 321—14X |

OTHER REFERENCES

Electronics, "Low-Cost Transistor Overload Safety Circuit," Oct. 14, 1960, p. 102.

WILLIAM H. BEHA, JR., Primary Examiner

U.S. Cl. X.R.

317—16, 33